March 16, 1954 — W. HEINS — 2,672,566
ELECTRIC MOTOR
Filed July 5, 1951 — 2 Sheets-Sheet 1
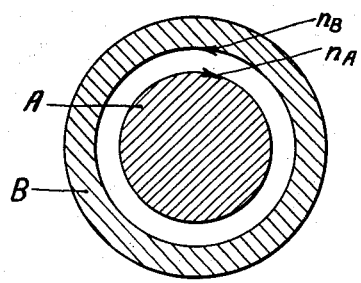
Fig. 1  $n_S = n_A + n_B$
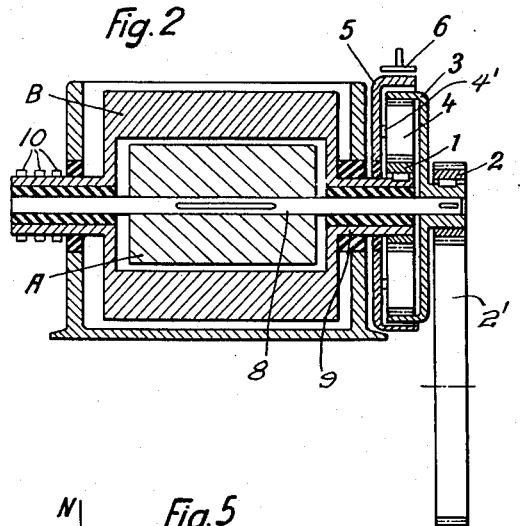
Fig. 2
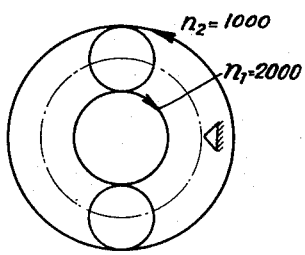
Fig. 3  $n_2 = 1000$, $n_1 = 2000$
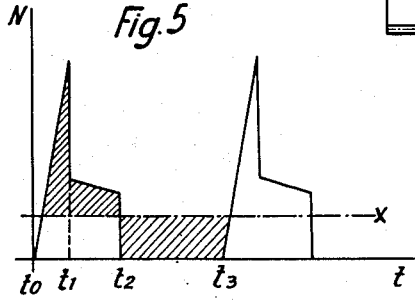
Fig. 5
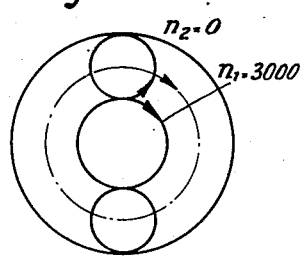
Fig. 4  $n_2 = 0$, $n_1 = 3000$
Inventor
Werner Heins Patented Mar. 16, 1954

2,672,566

UNITED STATES PATENT OFFICE 2,672,566

ELECTRIC MOTOR

Werner Heins, Salzgitter, Germany, assignor to Aktiengesellschaft für Bergbau- und Hüttenbedarf, Salzgitter, Germany Application July 5, 1951, Serial No. 235,211

Claims priority, application Germany July 7, 1950

7 Claims. (Cl. 310—121)

The present invention relates to an electric motor and more particularly, to an electric motor for overcoming heavy starting loads.

It is an object of the present invention to provide a relatively small motor capable of overcoming heavy initial loads.

It is another object of the present invention to provide a motor which is flexible as to the number of revolutions per minute thereof.

It is a further object of the present invention to provide a motor which can be stopped by braking.

It is still another object of the present invention to provide a motor having a flexible braking action.

An electric motor according to the present invention, comprises in combination, a shaft, an inner member rigidly connected to the shaft, an outer member coaxially arranged with respect to the shaft and the inner member, an electric winding arranged on the outer member, a planetary gear including a first sun wheel, a second sun wheel, and a planet wheel engaging the sun wheels, the first sun wheel being rigidly connected to the shaft, and releasable means for coupling the outer member with the second sun wheel, whereby the outer member forms a fly wheel which can be coupled to the second sun wheel when the outer member has reached the idle speed thereof so as to assist the inner member in overcoming heavy starting loads.

According to a preferred embodiment of the present invention a rotating member is provided for carrying the shaft of the planet wheel, means being arranged for braking the rotating member, whereby the angular speed of the outer member is suddenly changed by a stopping of the rotating member by the braking means so as to change the angular speed of the inner member and the shaft rigidly connected therewith.

In a preferred embodiment of the present invention electromagnetic means are provided for actuating the coupling means coupling the outer member with the second sun wheel.

Instead of the planetary gear, a differential gear may be provided.

Preferably, the means for braking the inner member by the outer member includes a plurality of toothed wheels, to at least one of which the outer member is rigidly connected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic cross-section of the inner and outer members;

Fig. 2 is a diagrammatic sectional side elevation of a first embodiment of the present invention;

Figs. 3 and 4 are diagrams for explaining the operation of the electric motor shown in Fig. 2;

Fig. 5 is a diagram showing the energy consumption of the motor shown in Fig. 2 plotted against time.

Figure 6:
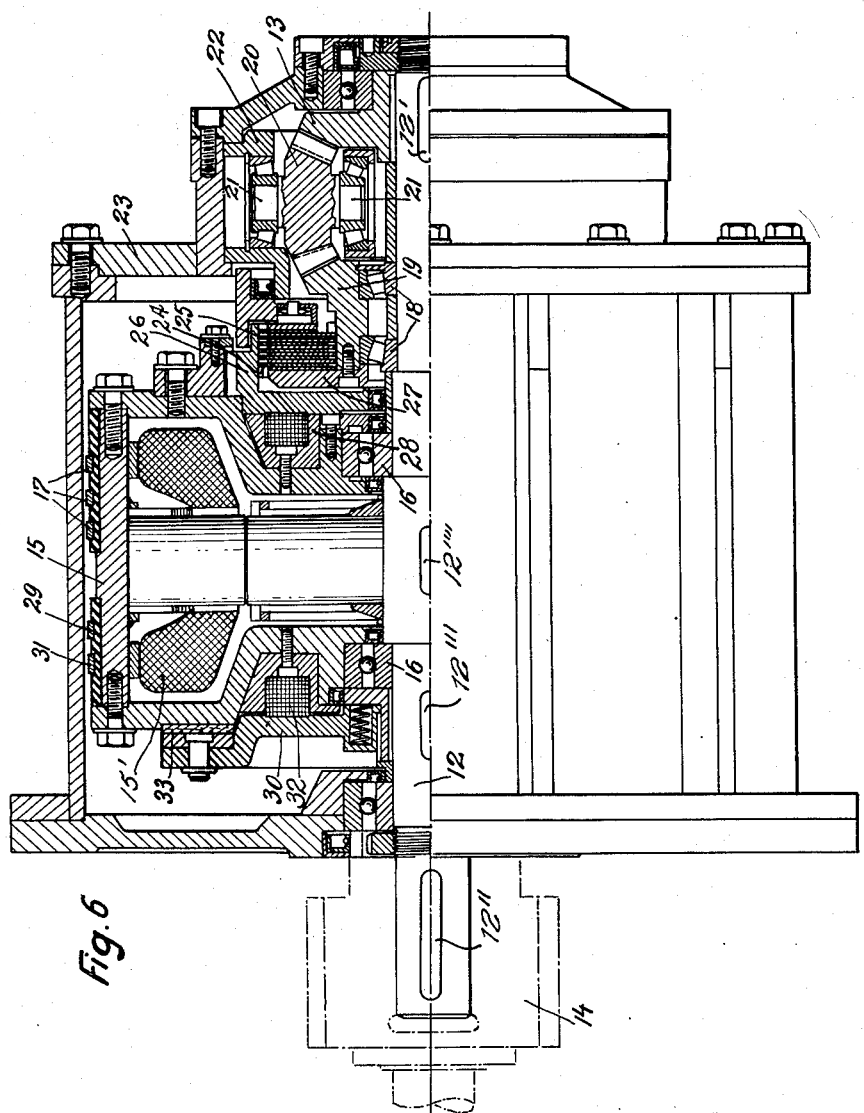
Fig. 6 is a side elevation partly in section of a practical embodiment of a motor according to the present invention.

Referring now to the drawings and first to Fig. 1, A is the inner member designed as a squirrel cage armature of an electric motor, the outer member B of which is coaxially arranged with respect to the inner member A. Electrical energy is supplied to the outer member B by means of slip-rings (not shown). $n_A$ is the number of R. P. M.'s of the inner member or armature A, whereas $n_B$ is the number of R. P. M.'s of the outer member B. $n_A$ and $n_B$ are connected with each other by the relation $$n_A + n_B = n_S$$

where $n_S$ is the synchronous number of R. P. M.'s. If the electric motor shown in Fig. 1 is running idle, the inner member A and the outer member B rotate in opposition to each other, and each of the values $n_A$ and $n_B$ is equal to half the synchronous speed $n_S$. However, if either of the rotating members changes the speed thereof by applying a load moment, the values $n_A$ and $n_B$ are no longer equal. However, $n_A$ and $n_B$ are still connected by the relation $n_A + n_B = n_S$.

Referring now to Fig. 2 of the drawings, showing a sectional elevation of the motor a crosssection of which is shown in Fig. 1, it will be seen that the inner member or armature A is rigidly connected to a shaft 8 to which a toothed wheel 2 and a sun wheel 3 (termed hereinafter "the first sun wheel") are rigidly connected. The outer member B is rigidly connected to a hollow shaft 9, arranged coaxially with the shaft 8 and rigidly connected to a sun wheel 1 (termed hereinafter "the second sun wheel").

Planet wheels 4 engage the sun wheels 1 and 3 and are carried with the shafts 4' thereof in a disc 5, which is rotatably arranged with respect to the hollow shaft 9, and can be arrested in space by a braking means 6. A toothed wheel 2' engages the toothed wheel 2 and is connected to the load by suitable means (not shown). 10 are the slip-rings connected to the winding (not shown) of the outer member B which is preferably provided with a three-phased winding.

The operation of the device will now be explained with reference to Figs. 3 and 4. If $r_1$ and $r_3$ are the radii of the pitch circles of the sun wheels 1 and 3, respectively, and $n_1$ and $n_2$ are the numbers of R. P. M.'s of the sun wheels 1 and 3, respectively, the following relations hold under any conditions:

$$n_s = n_1 + n_2 = u_B + n_A$$

$$\frac{n_1}{n_2} = \frac{r_3}{r_1}\left(=\frac{n_B}{n_A}\right)$$

$$\frac{r_1}{r_3} = u$$

$$n_2 = \frac{n_s}{1+u} = n_A$$

$$n_1 = \frac{n_s \cdot u}{1+u} = n_B$$

As examples, the following transmission ratios $u$ are chosen:

| $u = \dfrac{r_1}{r_3}$ | $n_1 = n_B$ | $n_2 = n_A$ |
|---|---|---|
| $\dfrac{1}{2}$ | 2,000 | 1,000 |
| $\dfrac{1}{3}$ | 2,250 | 750 |
| $\dfrac{1}{4}$ | 2,400 | 600 |

The dimensions of the motor and the windings thereof can be designed for a synchronous speed of 3,000 R. P. M. since the relative velocity of the rotating field remains constant.

If the motor runs idle, the carrier disc 5 for the planet wheels 4 being not braked, the R. P. M.'s of the inner and outer members are oppositely equal. The outer member serves as a fly wheel storing the energy corresponding to the number of R. P. M.'s at idle running. It should be understood that the energy stored in the outer member B is much larger than that stored in the inner member or armature A connected by the shaft 8 and the toothed wheels 2 and 2' to the load. The latter together with the armature A remain stationary if a heavy initial load is applied to the motor. Thus, the outer member B revolves at the full number of revolutions corresponding to the rotating field, i. e. in the example considered here at 3,000 R. P. M. The sun wheel 1 and the planet wheels 4 rotate at the same speed, the carrier disc 5 being carried along by the planet wheels 4.

If now the carrier disc 5 is braked by means of the braking member 6, the number of R. P. M.'s of the outer member B is reduced, and the energy stored in the outer member B is discharged through the inner member or armature A and the shaft 8 so that these elements are able to overcome the initial load applied thereto.

Figs. 3 and 4 are two diagrams for illustrating the relations between $n_1$ and $n_2$. Fig. 4 illustrates the case of an idle run of the motor in which the toothed wheel 2 and the sun wheel 3 rigidly connected thereto are stationary, so that $n_2 = 0$, whereas the sun wheel 1 and the outer member B rigidly secured thereto rotate at $n_1 = n_B = 3,000$.

Fig. 3 shows the relation between $n_1$ and $n_2$ after the braking of the disc 5 has been carried out, the transmission ratio $u$ being equal to $\frac{1}{2}$. The two sun wheels rotate in opposite directions, $n_1$ being equal to 2,000 and $n_2$ being equal to 1,000.

By the reduction of the speed of the outer member B from 3,000 to 2,000 R. P. M., more than 50% of the energy stored in the outer member B is transferred to the inner member or armature A since the energy is proportional to the square of the R. P. M.

By releasing the braking action, the drive-system 2, 2' is suddenly stopped and the stored energy is discharged through the outer member B, thus aiding in the acceleration thereof. In the following time period, the outer member B returns to the full speed of 3,000 R. P. M. The changes of the R. P. M.'s influence the current mains very little since the energy stored in the outer member B acting as a fly wheel is made use of in supplying the useful work.

Referring now to Fig. 5, showing a diagram of the energy consumption plotted against time it will be seen that a mean value corresponding to the horizontal line $x$ appears as the load on the mains which is much lower than with a direct and rigid driving connection. It should be understood that the device according to the present invention does not need any electrical starters, and that the electrical equipment thereof is very simple.

Referring now to Fig. 6, illustrating a practical example of a motor, according to the invention, a three-phased synchronous squirrel cage motor is shown. 11 is a squirrel cage armature which is connected by a key 12'''' to a shaft 12 which is connected by a key 12' to the first sun wheel 13, and by a key 12'' to a pinion 14, indicated by dotted lines, and forming part of the drive system. 15 is a carrier of a three-phased winding 15'. The carrier 15 is designed as a rotating solid of revolution acting as a fly wheel, ball-bearings 16 being provided for supporting the carrier 15 rotatably on the shaft 12. A three-phase current is supplied to the winding 15' by means of three slip-rings 17. The second sun wheel 19 of a planetary or differential gear is rotatably supported on the shaft 12 by means of roller bearings 18, whereas the planet wheels 20 are supported by shafts 21 within the annular bearing body 22, which is pressed into the casing 23 of the motor.

The sun wheel 19 is connected to the carrier 15 by electromagnetic coupling means comprising a multiple disc clutch 24, 25, and a magnet winding 28. The discs 24 are connected to the carrier 15 by means of a coupling member 26, whereas the discs 25 are connected to the sun wheel 19 by means of a coupling member 27. The magnet winding 28 is preferably arranged for excitation by a direct current which is supplied to the winding 28 through the slip-ring 29. The return circuit (not shown) forms part of the motor mass. If the winding 28 is energized, the coupling discs 24 and 25 are pressed against one another.

The operation of the motor so far described is as follows:

During idle run when the magnetic coupling 24 to 28 is released, the armature 11 and the fly-wheel carrier 15 rotate in opposite directions. If the armature 11 is braked by a resistance moment applied to the same through the pinion 14, the speed of the fly-wheel carrier 15 is increased to, say, twice the original value. The same relative speed between the fly-wheel carrier 15 and the armature 11 is realized from the very beginning if the motor is supposed to start against a heavy load moment.

If now the magnet winding 28 is energized, the armature 11 is coupled with the carrier 15 so that a final condition is reached in which the motor is running at half speed without, however, changing anything in the condition of the electromagnetic rotating field. By the reduction of the speed of the carrier 15 approximately half of the energy stored in the same is transmitted to the shaft 12 and accelerates the system (not shown) to be driven. The driving moment coming into operation is dependent on the time during which the coupling 24 to 28 is engaged. Practical tests have shown that easily a multiple of the starting moment of a normal motor having the same size and R. P. M. is obtainable with the motor according to Fig. 6.

Fig. 6 shows an additional device for using the motion of the carrier in opposite direction to that of the armature 11 for braking and reversing the movement of the shaft 12. This is achieved by means of a simple magnetic coupling because the power required during the reverse motion of the shaft 12 is only relatively small. It should be understood that instead of a magnetic coupling a different coupling could be used, for instance one involving toothed wheels, at least one of which is rigidly connected to the carrier 15. The magnetic coupling comprises a coupling disc 30, which is arranged for displacement on the shaft 12 with which it is connected for rotation by a key 12'''. A magnet winding 32 is arranged opposite to the coupling disc 30 and connected with one end to a slip-ring 31, the other end of the winding being connected to the mass of the motor. By energizing the winding 32, the coupling disc 30 is pressed against a friction surface 33, which is rigidly connected to the carrier 15. In order to accomplish the braking and the reversal of the revolution of the shaft 12 by means of the coupling device just described, the connection of the mains (not shown) with the slip-rings 17 must be interrupted by a device (not shown) connected to the energizing circuit of the magnet winding 32.

The operation of this device is as follows:

When the supply of energy to the slip-rings 17 is interrupted and the magnet winding 32 is energized, the magnetic coupling 30 to 33 couples the shaft 12 directly with the carrier 15, which, therefore, exerts a braking action on the shaft 12 rotating at first in opposite direction to the carrier 15. Eventually, the shaft 12 is rotated in the same direction as the carrier 15. The energy required for this action is taken from the fly wheel carrier 15 which has stored a limited amount of energy, which is sufficient for reversing the motion of the shaft 12 if the latter does not require a considerable amount of energy.

A motor of the kind described may be used in cases in which very large starting moments are to be overcome, such as in transporting heavy loads and in cases of driving mechanisms equipped with a fly wheel such as for punches and the like. In this case motors are required, the R. P. M. of which must be very flexible in order that the fly wheel may transfer the energy thereof.

Another case of application of the motor according to the invention is a rock boring machine in which the shaft 12 can be braked so that the same comes to rest provided that the braking effect is sufficiently yielding for an overcoming of the frictional moment by the torque. If the drill has become stuck in the rock, the rotating carrier 15 may be used for restarting the drill by coupling the carrier 15 with the shaft 12. It should be noted that in this case the magnitude of the additional starting moment depends only on the braking time.

It will be understood that each of the elements described above, or two or more together, may also find a useful application in other types of electric motors differing from the types described above.

While the invention has been illustrated and described as embodied in an electric motor for overcoming heavy starting loads, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric three-phased motor for overcoming heavy starting loads, comprising in combination, a shaft; an inner squirrel cage armature member rigidly connected to said shaft; an outer member coaxially arranged with respect to said shaft and said inner member; an electric three-phased winding arranged on said outer member; a planetary gear including a first sun wheel, a second sun wheel, and a planet wheel engaging said sun wheels, said first sun wheel being rigidly connected to said shaft; and releasable means for coupling said outer member with said second sun wheel, whereby said outer member forms a fly wheel which can be coupled to said second sun wheel when said outer member has reached the idle speed thereof so as to assist said inner member in overcoming heavy starting loads.

2. An electric three-phased motor for overcoming heavy starting loads, comprising in combination, a shaft; an inner squirrel cage armature member rigidly connected to said shaft; an outer member coaxially arranged with respect to said shaft and said inner member; an electric three-phased winding arranged on said outer member; a planetary gear including a first sun wheel, a second sun wheel, and a planet wheel engaging said sun wheels, said first sun wheel being rigidly connected to said shaft; releasable means for coupling said outer member with said second sun wheel, whereby said outer member forms a fly wheel which can be coupled to said second sun wheel when said outer member has reached the idle speed thereof so as to assist said inner member in overcoming heavy starting loads; a rotating member carrying the shaft of said planet wheel; and means for braking said rotating member, whereby the angular speed of said outer member is suddenly changed by stopping said rotating member by said braking means so as to change the angular speed of said inner member and said shaft rigidly connected therewith.

3. An electric three-phased motor for overcoming heavy starting loads, comprising in combination, a shaft; an inner squirrel cage armature member rigidly connected to said shaft; an outer member coaxially arranged with respect to said shaft and said inner member; an electric three-phased winding arranged on said outer member; a planetary gear including a first sun wheel, a second sun wheel, and a planet wheel engaging said sun wheels, said first sun wheel being rigidly connected to said shaft; means for coupling said outer member with said second sun wheel; and electromagnetic means for actuating said coupling means, whereby said outer member forms a fly wheel when said electromagnet means are de-energized so as to release said coupling means, said electromagnetic means being energized when said outer member has reached the idle speed thereof so as to assist said inner member in overcoming heavy starting loads.

4. An electric three-phased motor for overcoming heavy starting loads, comprising in combination, a shaft; an inner squirrel cage armature member rigidly connected to said shaft; an outer member coaxially arranged with respect to said shaft and said inner member; an electric three-phased winding arranged on said outer member; a planetary gear including a first sun wheel, a second sun wheel, and a planet wheel engaging said sun wheels, said first sun wheel being rigidly connected to said shaft; means for coupling said outer member with said second sun wheel; electromagnetic means for actuating said coupling means, whereby said outer member forms a fly wheel when said electromagnet means are de-energized so as to release said coupling means, said electromagnetic means being energized when said outer member has reached the idle speed thereof so as to assist said inner member in overcoming heavy starting loads; a rotating member carrying the shaft of said planet wheel; and means for braking said rotating member, whereby the angular speed of said outer member is suddenly changed by stopping said rotating member by said braking means so as to change the angular speed of said inner member and said shaft rigidly connected therewith.

5. An electric motor for overcoming heavy starting loads, comprising in combination, a shaft; an inner member rigidly connected to said shaft; an outer member coaxially arranged with respect to said shaft and said inner member; an electric winding arranged on said outer member; a gear for coupling said outer member to said shaft; means for adjusting the rate of transmission of said gear between a first value and a second value; and means for braking said inner member by said outer member whereby said outer member forms a fly wheel when the rate of transmission of said gear is adjusted to the first value thereof, said shaft being coupled to said outer member after the same has reached the idle speed thereof by an adjustment of the rate of transmission of said gear to the second value thereof, said inner member being suddenly retarded by application of said braking means.

6. An electric motor for overcoming heavy starting loads, comprising in combination, a shaft; an inner member rigidly connected to said shaft; an outer member coaxially arranged with respect to said shaft and said inner member; an electric winding arranged on said outer member; a gear for coupling said outer member to said shaft; means for adjusting the rate of transmission of said gear between a first value and a second value; and means for braking said inner member by said outer member, said braking means including a plurality of toothed wheels, said outer member being rigidly connected to at least one of said toothed wheels included in said braking means, whereby said outer member forms a fly wheel when the rate of transmission of said gear is adjusted to the first value thereof, said shaft being coupled to said outer member after the same has reached the idle speed thereof by an adjustment of the rate of transmission of said gear to the second value thereof, said inner member being suddenly retarded by application of said braking means.

7. An electric motor for overcoming heavy starting loads, comprising in combination, a shaft; an inner member rigidly connected to said shaft; an outer member coaxially arranged with respect to said shaft and said inner member; an electric winding arranged on said outer member; a planetary gear for coupling said outer member to said shaft; means for adjusting the rate of transmission of said planetary gear between a first value and a second value; and means for braking said inner member by said outer member, said braking means including a plurality of toothed wheels, said outer member being rigidly connected to at least one of said toothed wheels included in said braking means whereby said outer member forms a fly wheel when the rate of transmission of said planetary gear is adjusted to the first value thereof, said shaft being coupled to said outer member after the same has reached the idle speed thereof by an adjustment of the rate of transmission of said planetary gear to the second value thereof, said inner member being suddenly retarded by application of said braking means.

WERNER HEINS.

References Cited in the file of this patent

UNITED STATES PATENTS

| Number | Name | Date |
|---|---|---|
| 468,526 | Phillips | Feb. 9, 1892 |
| 665,318 | Garrett | Jan. 1, 1901 |
| 798,494 | Browning et al. | Aug. 29, 1905 |
| 2,388,955 | Couse | Nov. 13, 1945 |

FOREIGN PATENTS

| Number | Country | Date |
|---|---|---|
| 291,499 | Great Britain | May 29, 1928 |